W. H. CHAPMAN.
GENERATOR FOR STATIC ELECTRICITY.
APPLICATION FILED DEC. 4, 1914.
1,202,672.
Patented Oct. 24, 1916.
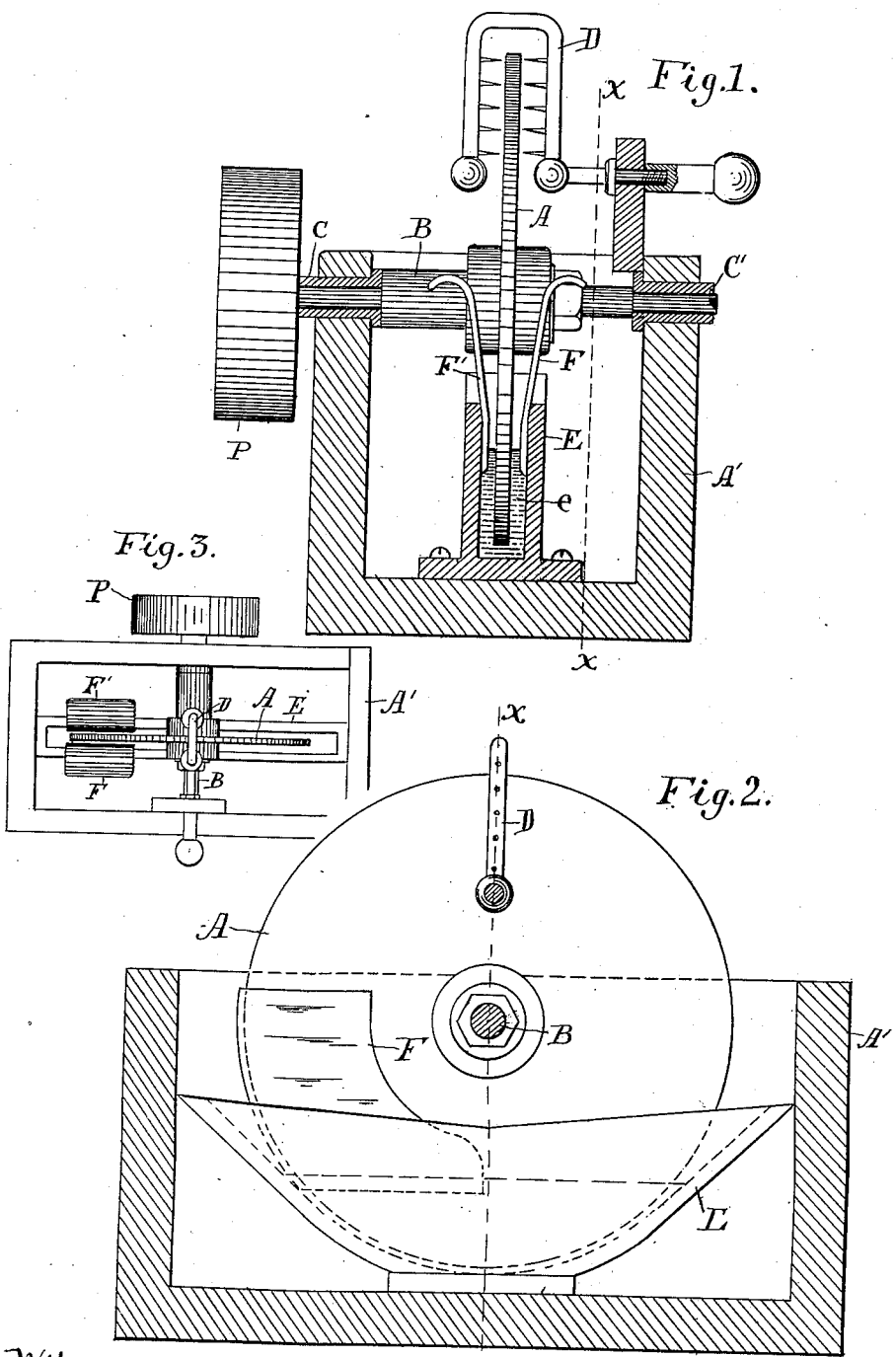

UNITED STATES PATENT OFFICE.

WILLIAM H. CHAPMAN, OF PORTLAND, MAINE.

GENERATOR FOR STATIC ELECTRICITY.

1,202,672.  Specification of Letters Patent.  Patented Oct. 24, 1916.

Application filed December 4, 1914. Serial No. 875,397.

*To all whom it may concern:*

Be it known that I, WILLIAM H. CHAPMAN, of Portland, in the county of Cumberland and State of Maine, have invented certain new and useful Improvements in Generators for Static Electricity, of which the following is a specification.

My invention relates to that type of electrical generators in which a charge of electricity is collected by comb points from the surface of a moving plate of glass or hard rubber or other insulating material after it has been developed there by friction as in "frictional machines", or electrostatic induction as in "influence machines".

The object of my invention is to provide a new means of developing the charge in the plate, a means by which the loss of power of frictional machines by mechanical friction is avoided, and on the other hand, uncertainty of polarity incident to influence machines is avoided, and a high efficiency is attained by reason of the intimate contact established between the active elements involved in the development of charges by separation of dissimilar substances.

It is well known that when two dissimilar substances are pressed tightly together and then separated, one of them acquires a positive charge and the other a negative charge. A leather belt running on an iron pulley is an illustration of this, where the belt acquires a negative charge at the point of separation from the pulley, the belt may develop a very strong charge when it is new and the surfaces are very dissimilar, but after a time the belt and the pulley both became coated to a more or less amount with dirt, grease and other foreign matter which renders the surfaces more nearly alike and the strength of charge is gradually weakened. This is the case also with all friction machines. The rubbing surfaces gradually deteriorate by becoming coated with similar foreign matter and must be frequently cleaned, or otherwise disturbed in some way to break up the similarity of surface that tends to be formed on the active elements of the machine.

My invention broadly consists in bringing a solid body of insulating material into intimate contact with a conducting liquid which will not adhere to its surface and then separating the solid body from the liquid and collecting from the surface of the solid, the charge thereon generated.

In the practical embodiment of my invention I construct a machine in which one of the elements is a body of liquefied metal such as mercury and the other element is the usual rotating disk of glass, hard rubber or other insulating material, the disk being partially immersed in the liquefied metal.

The intimate contact and separation of the liquid conductor and the plate produces in the plate a charge far greater than can be obtained by the friction of two solids rubbing against each other as in the ordinary frictional machines, and on the other hand, the polarity of the charge when a glass or hard rubber plate is revolved in a tray of pure mercury is invariably negative, although it may be purposely changed to positive of equal strength by the addition of a minute quantity of tin to the mercury.

The circulation of the liquid in the tray by the agitation of the revolving plate insures a constant dissimilarity between the surfaces in contact with each other, and the fact that mercury does not wet glass or other insulators, insures a perfect separation of the dissimilar materials where the plate leaves the mercury.

My invention further provides a means of binding the charge on the revolving plate until it is well separated from the mercury, and may be left free for collection by the comb points without danger of discharging back to ground through the mercury, as hereinafter set forth.

My invention may best be understood by reference to the accompanying drawing, in which is shown a practical form of machine designed to carry out the principles of my invention.

In the drawing, Figure 1 is a central vertical section on the line *x—x* of Fig. 2 with certain parts in elevation, Fig. 2 is a section on the line *x—x* of Fig. 1, and Fig. 3 is a plan of the machine on a small scale.

Referring to the drawings, a glass disk A is mounted on a horizontal shaft B running in bearings C D and having a pulley P adapted to receive a belt by which it may be driven by electric motor or other convenient source of power.

E is a trough containing a body of mercury *e* in which the lower part of the disk A is immersed. This trough may be of wood or aluminum with which the mercury will not form an alloy.

The parts above described are carried by a frame A. The charge is collected from the disk A by means of the usual comb points D. Means are provided to bind the charge which is developed on the surface of the plate A by its passage through the mercury and to prevent it discharging back to ground through the mercury. For this purpose I make use of two induction plates F F', one on either side of the disk at the point where it leaves the mercury.

The induction plates are made of conducting, or partially conducting material. Ordinary wood may be sufficiently conducting to serve the purpose which is to have an opposing charge induced in them by the charge on the plate and said charge acting as a binder to the charge on the disk keeping its potential low while near the point of separation from the mercury. If the trough is made of aluminum or iron, the induction plates may be cast in one piece with it. The induction plates are so formed and positioned that each portion of the revolving plate gradually recedes from them as it recedes from the mercury. The lower edges of the induction plates are below the surface of the mercury and in close proximity to the revolving plate, while the upper edges are located at some distance from the revolving plate and are rounded to prevent brush discharges between them and the revolving plate. It is important also for the same reason to have the induction plates perfectly smooth and in some cases it is an advantage to have them covered with a sheet of rubber or glass. They serve to keep the electrical potential reduced to a minimum by condenser action on that portion of the revolving plate which is just emerging from the mercury, and they also reduce the electrical attraction exerted by the charge on the revolving plate, tending to lift the mercury into a sharp edge form which would increase the backward discharge from the revolving plate to ground. The effectiveness of the induction plates in preventing these actions is easily observed by revolving the plate backward when it is found that the charge delivered to the comb points is very much reduced, and the mercury instead of forming the usual curved surface by capillary repulsion next to the plate, is actually drawn up onto it as if by attraction at the point where the plate leaves the mercury. In case it is desirable to adapt the machine to run in either direction, this may be done by placing another pair of induction plates at the other end of the mercury trough.

It is important to use a liquid that is an electrical conductor so as to convey away to earth the opposing charge, and it must not wet the plate because there is no charge developed except as there is a decided separation of the two dissimilar materials from each other. I have found that a glass plate 8" diameter revolving 80 revolutions per minute and dipping into a mercury trough to a depth of 1½", without induction plates, will develop a potential of 9000 volts on comb points, arranged to collect the charge at the top of the plate. The application of induction plates in proximity to the revolving plate at the point where it leaves the mercury raises the potential to 13,000 volts or more on the comb points and gives sparks ¾" long. This is still further increased by covering the induction plates with a thin sheet of rubber or glass. In order to increase the quantity of electricity generated, a number of glass plates may be mounted on one shaft and separated by washers and all dipping into one trough of mercury or in separate narrow troughs.

It is evident that the principle embodied in my invention is capable of a great variety of embodiments of which I have illustrated a single example.

I claim:—

1. The process of generating static electricity which consists of bringing a body of glass or other insulating material continuously into and out of contact with a body of conducting liquid which does not adhere to it and collecting the resulting charge.

2. The process of generating static electricity which consists of bringing a body of insulating material continuously into and out of contact with a liquefied metal which does not adhere to it and collecting the resulting charge.

3. The process of generating static electricity which consists of passing a body of insulating material continuously through a liquefied metal and collecting the resulting charge.

4. In a machine for generating static electricity, the combination of a movable member of insulating material, a fixed member having a cavity therein containing a body of conducting liquid which does not adhere to the said insulating material and means for bringing the movable member continuously into and out of contact with said liquid.

5. In a machine for generating static electricity, the combination of a movable member of insulating material, a fixed member having a cavity therein containing a body of conducting liquid which does not adhere to said insulating material and means for passing said movable member into and out of contact with said liquid.

6. In a machine for generating static electricity, the combination of a rotatable member of insulating material and a trough containing a body of conducting liquid which does not adhere to the said insulating material, said rotating member being partially immersed in said liquid.

7. A machine for generating static electricity including a rotatable member of insulating material and a body of mercury in which said member is partially immersed.

8. In a machine for generating static electricity, the combination of a trough having therein a body of liquefied metal, a rotatable disk of insulating material partially immersed in said metal and means for collecting the electricity from the surface of said disk.

9. In a machine for generating static electricity, the combination of a rotatable disk of insulating material, a trough in which the lower edge of said disk runs and a body of conducting liquid which will not adhere to said disk in said trough and covering the lower edge of said disk.

10. In a machine for generating static electricity, the combination of a rotatable disk of insulating material, a body of conducting liquid incapable of adhering to said material in which liquid said disk is partially immersed and means for binding the charge of electricity on the disk after it leaves the liquid.

11. In a machine for generating static electricity, the combination of a trough having a body of liquefied metal therein, a rotatable disk partially immersed in said metal and means for binding the charge of electricity to said disk after it leaves the liquid.

12. In a machine for generating static electricity, the combination of a trough having a body of liquefied metal therein, a rotatable disk of insulating material partially immersed in said metal and an induction plate of conducting material positioned adjacent to said disk beyond where it leaves the metal.

13. In a machine for generating static electricity, the combination of a trough having therein a body of liquefied metal, a rotatable disk of insulating material partially immersed in said metal and an induction plate of conducting material adjacent to the disk, said plate being formed and positioned to gradually recede from the surface of the disk as the latter recedes from the metal.

14. In a machine for generating static electricity, the combination of a trough having therein a body of liquefied metal, a rotatable disk of insulating material partially immersed in said metal, a pair of induction plates, one at each side of and adjacent to the disk, the said induction plates being formed and positioned so that their surfaces gradually recede from the surfaces of the disk as the latter recedes from the metal.

In testimony whereof I have affixed my signature, in presence of two witnesses.

WILLIAM H. CHAPMAN.

Witnesses:
S. W. BATES,
FLORENCE A. YOUNG.